(12) United States Patent
Harada et al.

(10) Patent No.: US 8,155,064 B2
(45) Date of Patent: Apr. 10, 2012

(54) COMMUNICATION SYSTEM, COMMUNICATION DEVICE, COMMUNICATION METHOD, AND PROGRAM

(75) Inventors: Atsushi Harada, Kawasaki (JP); Sadayuki Abeta, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 868 days.

(21) Appl. No.: 12/159,550

(22) PCT Filed: Dec. 25, 2006

(86) PCT No.: PCT/JP2006/325728
§ 371 (c)(1),
(2), (4) Date: Sep. 24, 2008

(87) PCT Pub. No.: WO2007/077777
PCT Pub. Date: Jul. 12, 2007

(65) Prior Publication Data
US 2009/0180432 A1 Jul. 16, 2009

(30) Foreign Application Priority Data
Dec. 28, 2005 (JP) .................................. 2005-379989

(51) Int. Cl.
*H04W 4/00* (2009.01)
(52) U.S. Cl. ........................................ 370/329; 455/512
(58) Field of Classification Search .................. 370/329, 370/330, 331, 332, 333, 334; 455/434, 515, 455/436, 522
See application file for complete search history.

(56) References Cited

U.S. PATENT DOCUMENTS
2005/0107105 A1* 5/2005 Wakabayashi ................ 455/515
2006/0153128 A1* 7/2006 Frederiksen et al. ......... 370/329

FOREIGN PATENT DOCUMENTS
| JP | 6-268575 | 9/1994 |
| JP | 2003-009223 A | 1/2003 |
| JP | 2004-343524 | 12/2004 |
| JP | 2005-12366 | 1/2005 |
| JP | 2005-210753 A | 8/2005 |
| JP | 2007-503139 | 2/2007 |
| WO | 98/58503 | 12/1998 |
| WO | 2006/043588 | 4/2006 |

OTHER PUBLICATIONS

Japanese Office Action for Patent Application No. 2005-379989; Mailing date Dec. 7, 2010 (5 pages).

(Continued)

*Primary Examiner* — Huy Vu
*Assistant Examiner* — Dady Chery
(74) *Attorney, Agent, or Firm* — Osha • Liang LLP

(57) ABSTRACT

A disclosed communication system includes a base station and mobile stations. The base station includes a group management unit configured to classify the mobile stations into groups according to signal quality information transmitted from the mobile stations, a storing unit configured to store correspondence information on the correspondence between the groups and subframes constituting at least a part of a radio frame, a scheduling unit configured to schedule packets for the mobile stations according to the correspondence information, and a transmitting unit configured to transmit the correspondence information to the mobile stations. Each mobile station includes a transmitting unit configured to transmit the signal quality information indicating received signal quality to the base station, and a receiving unit configured to receive the packets transmitted from the base station in one of the subframes that corresponds to one of the groups to which the mobile station belongs.

13 Claims, 4 Drawing Sheets

OTHER PUBLICATIONS

International Search Report w/translation from PCT/JP2006/325728 dated Mar. 27, 2007 (5 pages).
Written Opinion from PCT/JP2006/325728 dated Mar. 27, 2007 (4 pages).

3GPP TS25.308 V6.3.0; "Overall Description" Dec. 2004 (28 pages).
3GPP TSG RAN WG2#49 R2-052994; "Scheduling Support for Voice Services in E-UTRA"; Nov. 2005 (3 pages).
3GPP TSG-RAN WG2 meeting #49 R2-052980; "HSDPA Enhancement for Real-Time Services"; Nov. 2005 (7 pages).

* cited by examiner

FIG.2

| MCS NUMBER (GROUP) | MODULATION SCHEME | CHANNEL CODING RATE | RELATIVE TRANSMISSION RATE | SUBFRAME |
|---|---|---|---|---|
| MCS1 | QPSK | 1/3 | 1 | T1 |
| MCS2 | QPSK | 1/2 | 1.5 | T2 |
| MCS3 | QPSK | 2/3 | 2 | T3 |
| MCS4 | QPSK | 6/7 | 2.57 | T4 |
| MCS5 | 16QAM | 1/2 | 3 | T5 |
| MCS6 | 16QAM | 2/3 | 4 | T6 |
| MCS7 | 16QAM | 3/4 | 4.5 | T7 |
| MCS8 | 16QAM | 5/6 | 5 | T8 |

LOW CQI ←――――――――→ HIGH CQI

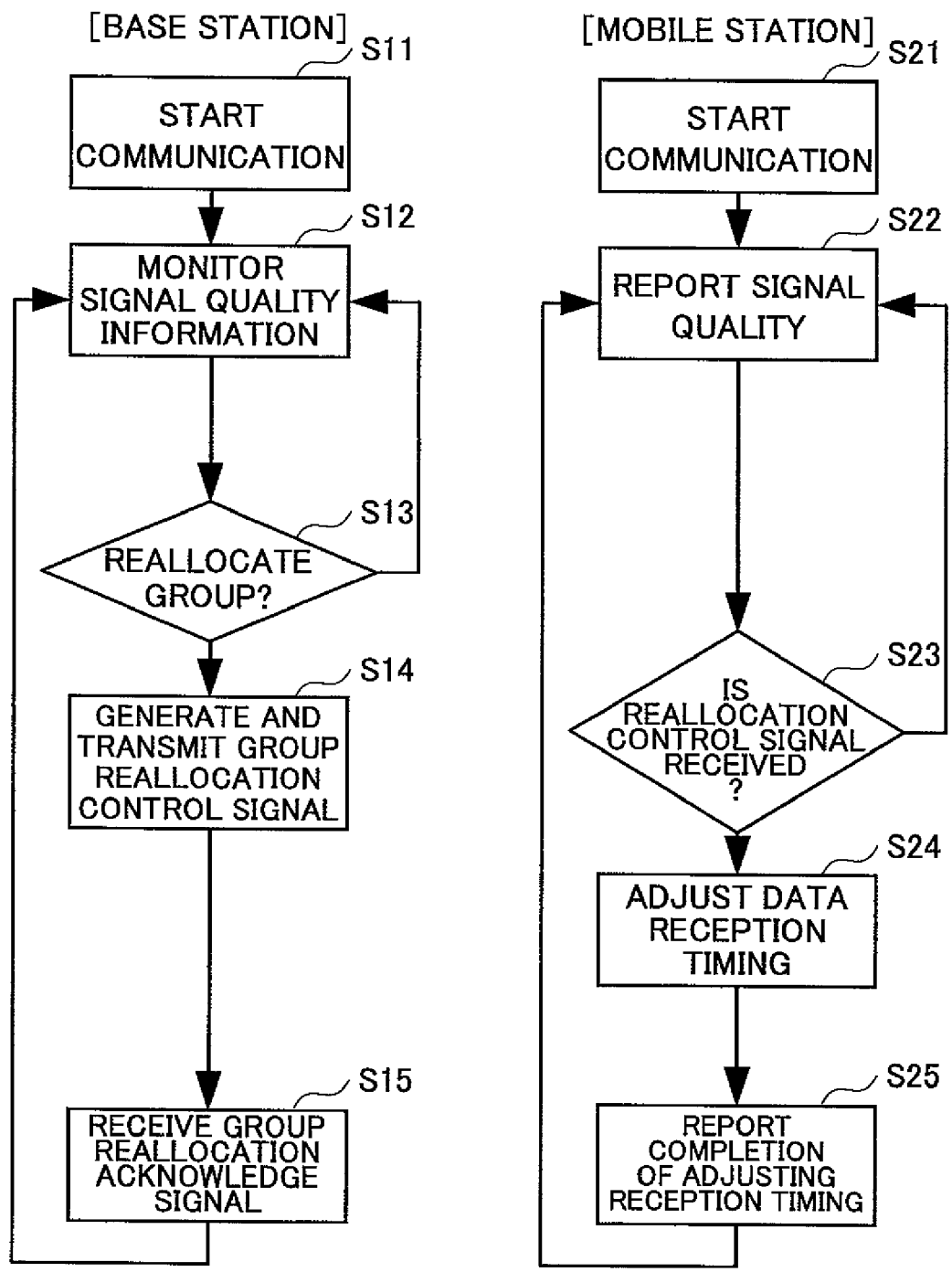

COMMUNICATION SYSTEM, COMMUNICATION DEVICE, COMMUNICATION METHOD, AND PROGRAM

TECHNICAL FIELD

The present invention generally relates to the field of wireless communication. More particularly, the present invention relates to a communication system, a communication device, a communication method, and a program.

BACKGROUND ART

The high speed downlink packet access (HSDPA) is a packet transmission method of IMT-2000 and is currently employed to implement a high-speed, high-capacity downlink. In HSDPA, scheduling is performed to allocate channel resources preferentially to users in good channel conditions and thereby to improve the throughput. For this purpose, a shared control channel (HS-SCCH) for reporting scheduling information and transmission schemes is provided along with a shared data channel (HS-DSCH). Because the scheduling information differs depending on the user, it is necessary to provide the same number of shared control channels (HS-SCCH) as the number of concurrent users. HSDPA is described, for example, in non-patent document 1.

Generally, in data communications, packets are not necessarily transmitted in real time and the sizes of the packets are comparatively large. Therefore, the number of concurrent users and the number of shared control channels (HS-SCCH) can be made comparatively small. If the number of shared control channels is small, a large share of the total transmission power of a base station can be allocated to the shared data channel. Thus, the current HSDPA scheme is preferable for efficient data communications.

Meanwhile, packets in wireless communications include not only data packets but also voice packets sent by voice over internet protocol (VoIP). Voice packets are preferably transmitted in real time and their sizes are comparatively small. Therefore, to efficiently use frequency and time resources, it is preferable to multiplex and thereby simultaneously transmit packets of many users. However, according to the current HSDPA scheme, the number of shared control channels (HS-SCCH) required increases as the number of concurrent users increases. This in turn increases the share of the total transmission power of the base station to be allocated to shared control channels and therefore decreases the power usable for the shared data channel. As a result, the throughput of the shared data channel in multiplex transmission of voice packets may be reduced.

A method disclosed in non-patent document 2 tries to solve this problem. In the disclosed method, mobile stations in similar communication conditions are grouped and a common transmission scheme (including a modulation scheme, a channel coding rate, a retransmission control scheme, etc.) is used for each group. Each mobile station is able to know the corresponding transmission scheme by just identifying the group to which it belongs. This in turn makes it possible to reduce the information content as well as the number of control channels. Also, a method disclosed in non-patent document 3 proposes a new signal format that requires no control channel like HS-SCCH.

[Non-patent document 1] 3GPP, TS25.308
[Non-patent document 2] 3GPP, R2-052994
[Non-patent document 3] 3GPP, R2-052980

DISCLOSURE OF INVENTION

Problems to be Solved by the Invention

However, non-patent document 2 does not disclose enough concrete measures to reduce the information content of control channels. Meanwhile, in the method disclosed in non-patent document 3, because of not using control channels, the mobile station has to select a transmission scheme from a very limited number of alternatives. The mobile station tries all of the limited number of alternatives and selects the most appropriate one. Accordingly, with this method, it is difficult to perform sufficient link adaptation and therefore it is difficult to improve the throughput by efficient use of resources. In this case, increasing the number of alternatives results in an excessive processing load of the mobile station and is therefore not preferable.

One objective of the present invention is to provide a communication system, a communication device, a communication method, and a program that make it possible to reduce the information content of control channels used for multiplex transmission of a large number of small-sized packets.

Means for Solving the Problems

A communication system according to an embodiment of the present invention includes a base station and mobile stations. The base station includes a group management unit configured to classify the mobile stations into groups according to signal quality information transmitted from the mobile stations, a storing unit configured to store correspondence information on the correspondence between the groups and subframes constituting at least a part of a radio frame, a scheduling unit configured to schedule packets for the mobile stations according to the correspondence information, and a transmitting unit configured to transmit the correspondence information to the mobile stations. Each mobile station includes a transmitting unit configured to transmit the signal quality information indicating received signal quality to the base station, and a receiving unit configured to receive the packets transmitted from the base station in one of the subframes that corresponds to one of the groups to which the mobile station belongs.

Advantageous Effect of the Invention

Embodiments of the present invention make it possible to reduce the information content of control channels used for multiplex transmission of a large number of small-sized packets.

BRIEF DESCRIPTION OF THE DRAWINGS

FIG. 2 is a table showing the correspondence between MCS numbers, modulation schemes, channel coding rates, relative transmission rates, and subframes;

FIG. 4 is a set of flowcharts showing an exemplary process for changing the group of a mobile station.

EXPLANATION OF REFERENCES

Figure 1:
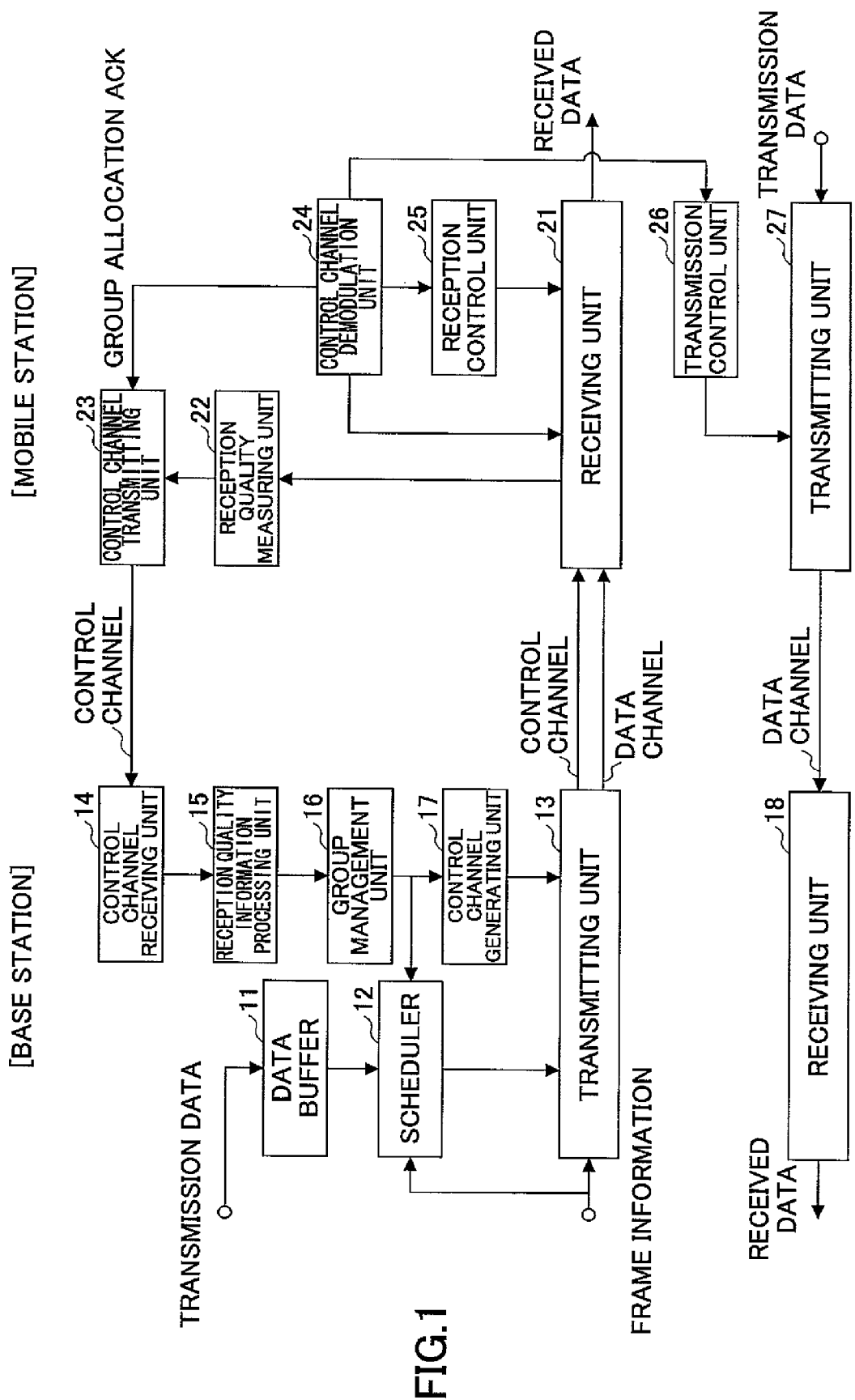
FIG. 1 is a drawing illustrating a base station and a mobile station used in a communication system according to an embodiment of the present invention.

11 Data buffer
12 Scheduler

13 Transmitting unit
14 Control channel receiving unit
15 Reception quality information processing unit
16 Group management unit
17 Control channel generating unit
18 Receiving unit
21 Receiving unit
22 Reception quality measuring unit
23 Control channel transmitting unit
24 Control channel demodulation unit
25 Reception control unit
26 Transmission control unit
27 Transmitting unit

BEST MODE FOR CARRYING OUT THE INVENTION

According to an embodiment of the present invention, mobile stations are grouped according to signal quality reported by the mobile stations, and communications with the mobile stations are performed within respective subframes (transmission time intervals) allocated to the corresponding groups. The correspondence between transmission schemes and subframes in a radio frame is predetermined. This approach makes it possible to significantly reduce the amount of control information to be sent to mobile stations. According to another embodiment, a radio frame is divided into a period for transmitting voice packets and a period for transmitting non-voice packets. During the period for voice packets, shared control channels are practically not necessary for scheduling. During the period for non-voice packets (packets with comparatively large sizes), shared control channels are necessary for scheduling. Dividing a radio frame into periods as described above makes it possible to improve the efficiency of timing management involved in sending and receiving shared control channels. According to another embodiment, subframes in a radio frame are arranged in descending or ascending order of transmission rates. For example, a subframe for a user group with a larger MCS number is followed by a subframe for a user group with a smaller MCS number. According to still another embodiment, group reallocation (or group change) is performed such that the allocated subframe shifts only one subframe forward or backward each time. This approach makes it possible to reduce the amount of control information to be transmitted to each mobile station when its group is reallocated. The control information may be transmitted as L1 control information or L2 control information. The L1/L2 control information may be transmitted separately from the shared data channel or as a part of the shared data channel.

First Embodiment

FIG. 1 is a drawing illustrating a base station and a mobile station used in a communication system according to an embodiment of the present invention. The base station includes a data buffer 11, a scheduler 12, a transmitting unit 13, a control channel receiving unit 14, a reception quality information processing unit 15, a group management unit 16, a control channel generating unit 17, and a receiving unit 18.

The data buffer 11 stores transmission data for mobile stations.

The scheduler 12 determines mobile stations to which frequency and/or time resources are to be allocated and the timings of allocating the resources. Different from conventional devices or methods, the scheduler 12 performs scheduling taking into account frame information and group information as described later.

The transmitting unit 13 transmits a scheduled shared data channel in a format indicated by the frame information. The transmitting unit 13 also transmits control channels generated by the control channel generating unit 17. The control channels and the shared data channel may be multiplexed or transmitted separately. Further, the transmitting unit 13 transmits the frame information as broadcast information to mobile stations within its coverage. The frame information includes information on the correspondence between subframes constituting a frame and groups described later.

The control channel receiving unit 14 receives control channels from mobile stations. For example, a control channel includes received signal quality information (i.e., channel quality indicator (CQI)) on a downlink pilot channel, information indicating whether downlink packets are properly received (acknowledge (ACK) or negative acknowledge (NACK)), and a signal acknowledging a group change (group allocation ACK).

The reception quality information processing unit 15 extracts the signal quality information on the downlink pilot channel from the control channel. Also, the reception quality information processing unit 15 measures received signal quality of an uplink pilot channel as necessary.

The group management unit 16 groups mobile stations according to the signal quality of the downlink pilot channel reported by the mobile stations. In this embodiment, mobile stations are classified into eight groups according to the signal quality levels. In other words, one or more mobile stations reporting similar signal quality levels are included in the same group. Basically, one mobile station belongs to one group. However, groups may be structured such that one mobile station belongs to multiple groups. In this embodiment, signal quality levels are associated with MCS numbers. The MCS numbers are used to identify combinations of modulation schemes and channel coding rates. Information on the correspondence between mobile stations and groups is sent to the scheduler 12 and the control channel generating unit 17.

FIG. 2 is a table showing the correspondence between MCS numbers, modulation schemes, channel coding rates, relative transmission rates, and subframes. As shown in the left-most column of the table, MCS numbers represent eight groups. The MCS numbers correspond to the levels of CQIs. A small MCS number corresponds to a low CQI (e.g., of a user at a cell edge) and is associated with a modulation scheme and a channel coding rate that are suitable to improve the reliability of data transmission. More specifically, for a group associated with a small MCS number, a small number of modulation levels and a low channel coding rate are used. On the other hand, a large MCS number corresponds to a high CQI (e.g., of a user near a base station) and is associated with a modulation scheme and a channel coding rate that are suitable to improve the transmission rate. More specifically, for a group associated with a large MCS number, a large number of modulation levels and a high channel coding rate are used. Values shown in FIG. 2 are just examples and are not intended to limit the scope of the present invention. The number of MCS numbers may be greater or less than eight. Also, modulation schemes and channel coding rates other than those shown in FIG. 2 may be used.

The control channel generating unit 17 shown in FIG. 1 generates a control channel including information on a group to which the mobile station belongs and/or information necessary to change the group.

The receiving unit 18 receives an uplink shared data channel from the mobile station.

The mobile station includes a receiving unit 21, a reception quality measuring unit 22, a control channel transmitting unit 23, a control channel demodulation unit 24, a reception control unit 25, a transmission control unit 26, and a transmitting unit 27.

The receiving unit 21 receives a control channel and a shared data channel from the base station. The receiving unit 21 also receives broadcast information. The broadcast information may include information on the correspondence between subframes and groups described above in addition to regular information such as identification information of the base station.

The reception quality measuring unit 22 measures the received signal quality (CQI) of a downlink pilot channel.

The control channel transmitting unit 23 generates and transmits a control channel. For example, a control channel includes received signal quality information (i.e., channel quality indicator (CQI)) on a downlink pilot channel, information indicating whether downlink packets are properly received (acknowledge (ACK) or negative acknowledge (NACK)), and a signal acknowledging a group change (group allocation ACK).

The control channel demodulation unit 24 demodulates a control channel from the base station.

The reception control unit 25 controls the receiving unit 21 according to information in the control channel from the base station. For example, the reception control unit 25 controls the receiving unit 21 based on the correspondence information to receive a shared data channel in a subframe corresponding to a group to which the mobile station belongs.

The transmission control unit 26 controls the transmitting unit 27 according to information in the control channel. For example, the transmission control unit 26 controls the transmitting unit 27 based on the correspondence information and scheduling information for the uplink channel to transmit a shared data channel in a subframe corresponding to a group to which the mobile station belongs.

The transmitting unit 27 transmits transmission data under the control of the transmission control unit 26.

An exemplary process is described below. First, the base station classifies mobile stations into groups MCS1 through MCS8 based on the received channel quality reported by the mobile stations. As shown in the right-most column of FIG. 2, eight subframes T1 through T8 are associated with the MCS numbers indicating groups. The correspondence information as shown in FIG. 2 is provided as "frame information" to the scheduler 12 and the transmitting unit 13. The frame information may also be sent to the mobile stations as broadcast information.

Figure 3:
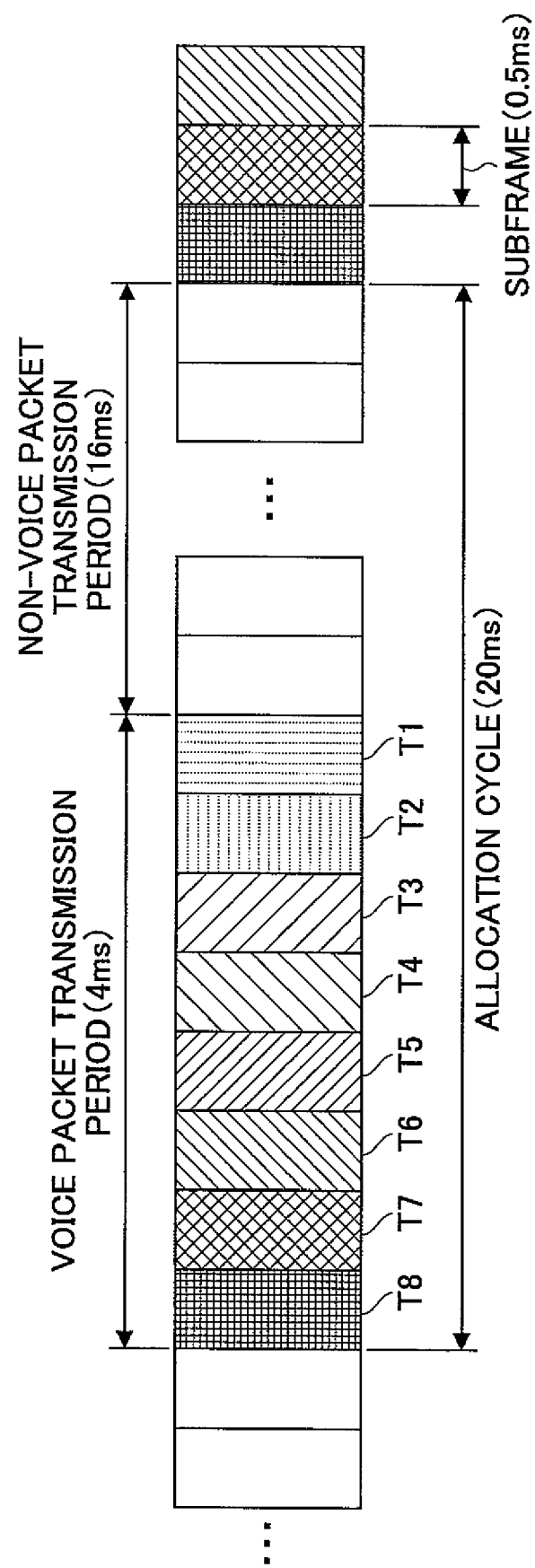
FIG. 3 is a drawing illustrating an exemplary frame format according to an embodiment of the present invention.

In the example shown in FIG. 3, a frame (allocation cycle) of 20 ms is divided into a period (4 ms) for mainly transmitting voice packets and a period (16 ms) for mainly transmitting non-voice packets. The present invention may be applied not only to multiplexing of voice packets but also to any other case where many small-sized packets are multiplexed. The period for mainly transmitting voice packets is composed of the subframes T1 through T8. Subframes may be represented by transmission time intervals (TTIs). In this embodiment, the length of each subframe is 0.5 ms. The correspondence between subframes and TTIs is not necessarily one to one. For example, one TTI may be composed of multiple subframes. A frame structure as described above may be used statically in a cell or may be used dynamically by changing the number of subframes. In either case, it is necessary to notify the mobile station of the frame structure before the mobile station starts communications. Here, it is assumed that the group management unit 16 of the base station has determined that a mobile station A belongs to the group MCS5. According to the correspondence information shown in FIG. 2, the group MCS5 corresponds to the subframe T5. Therefore, a shared data channel (voice packets) for the mobile station A is scheduled to be transmitted in the subframe T5 shown in FIG. 3. If retransmission is not taken into account, voice packets for the mobile station A are transmitted only in the subframe T5 in the current allocation cycle.

Preferably, a subframe used for retransmission is also predetermined. For example, packets transmitted in the subframe T8 may be retransmitted in the subframe T8 in the next allocation cycle, or may be retransmitted in the subframe T5 in the same allocation cycle. In the latter case, it is unknown whether the subframe T5 is transmitted according to the transmission scheme of MCS8 or the transmission scheme of MCS5. In such a case, the receiving end may try both transmission schemes to demodulate the channel and select meaningful information from the results (this method is called blind estimation). Alternatively, indicator information indicating which one of the transmission schemes of MCS8 and MCS5 is used to transmit the subframe T5 may be sent separately to the receiving end.

The mobile station A is provided with information on the correspondence between subframes and groups in advance. Also, the mobile station A is notified of the group it belongs to at the beginning of the communication. The information necessary to notify a mobile station of its group includes just the group and identification information (or an identifier) of the mobile station, and is therefore smaller than that necessary to notify the transmission scheme and the subframe themselves. The identification information can be expressed by a small number of bits because it is used to identify one of mobile stations multiplexed in one subframe. Also, it is not necessary to transmit the information indicating the group of a mobile station each time the shared data channel is transmitted as long as the communication condition is unchanged. As described above, once the group is determined, the transmission scheme (a modulation scheme, a channel coding rate, etc.) can be identified. According to the transmission scheme, the mobile station A demodulates only the subframe T5 in a received frame and thereby extracts voice packets for itself. Thus, the above approach makes it possible to virtually eliminate the need to use conventional control channels like HS-SCCH.

In the above exemplary process, a frame format as shown in FIG. 3 is applied to the downlink shared data channel. A similar frame format may also be applied to the uplink shared data channel. Also in this case, the base station performs scheduling and notifies each mobile station of its group so that the mobile station can identify a subframe for transmission. The information necessary to notify a mobile station of its group includes just the group and identification information (or an identifier) of the mobile station, and is therefore smaller than that necessary to notify the transmission scheme and the subframe themselves.

Second Embodiment

FIG. 4 is a set of flowcharts showing an exemplary process for changing the group of a mobile station. In FIG. 4, steps S11 through S15 performed by the base station and steps S21 through S25 performed by the mobile station are shown in parallel. At the beginning of communication, the base station transmits, to the mobile station, information on a frame format, information on the correspondence between groups and subframes, and information indicating the initial group of the mobile station (S11). The mobile station receives the pieces of information and prepares for the communication (S21).

Then, the mobile station reports the current received signal quality to the base station (S22).

The base station monitors the signal quality reported by the mobile station (S12) and determines whether to change the group to which the mobile station belongs. This is because the communication condition of the mobile station may change as time passes. The signal quality may be represented by an instantaneous value or an average value. If there is no need to change the group, the process returns to step S12. If it is necessary to change the group, the process goes to step S14, and the base station generates a control signal for reporting the group change and transmits the control signal to the mobile station. The control signal may be implemented by a layer 2 control message (L2 message) that reports an allocation change by an allocated subframe. Alternatively, the control signal may be implemented by a layer 1 control message (L1 message) indicating that the mobile station is moved to a group with an MCS number that is one number higher or lower than the current MCS number. A group change may be reported using one or both of the L1 and L2 messages. The communication condition of a mobile station normally changes gradually rather than drastically. Therefore, a group change may be limited such that the MCS number is increased or decreased by only 1 at a time. In this case, a group change can be indicated with one bit. For example, "1" indicates an increase of the MCS number and "0" indicates a decrease of the MCS number. Further, if the subframes are arranged in order of signal quality levels as shown in FIG. 3, the subframe for a mobile station is shifted only to an adjacent subframe even if the group is changed.

In step S23, the mobile station determines whether a reallocation control signal indicating a group change has been received. If the reallocation control signal has not been received, the process returns to step S22. If the reallocation control signal has been received, the process goes to step S24.

In step S24, the mobile station adjusts the data reception timing according to the change of its group indicated by the reallocation control signal sent from the base station.

In step S25, the mobile station reports to the base station that a process involved in the group reallocation has been completed.

In step S15, the base station receives a group reallocation acknowledge signal from the mobile station. Then, the process returns to step S12 and the base station repeats the steps described above.

In the above embodiment, a group reallocation process is triggered by signal quality information (CQI). Alternatively, group reallocation may be initiated based on any other criterion. For example, the base station may be configured to calculate an error rate based on the negative acknowledge (NACK) sent from the mobile station and to determine whether to change the group based on whether the error rate is greater than a threshold.

The present invention is not limited to the specifically disclosed embodiments, and variations and modifications may be made without departing from the scope of the present invention.

Although the present invention is described above in different embodiments, the distinctions between the embodiments are not essential for the present invention, and the embodiments may be used individually or in combination.

The present international application claims priority from Japanese Patent Application No. 2005-379989 filed on Dec. 28, 2005, the entire contents of which are hereby incorporated herein by reference.

The invention claimed is:

1. A communication system, comprising:
a base station; and
mobile stations; wherein
the base station includes
a group management unit configured to classify the mobile stations into groups according to signal quality information transmitted from the mobile stations,
a storing unit configured to store correspondence information on the correspondence between the groups and subframes constituting at least a part of a radio frame,
a scheduling unit configured to schedule packets for the mobile stations according to the correspondence information, and
a transmitting unit configured to transmit the correspondence information to the mobile stations, wherein the groups are each associated with MCS numbers indicating combinations of modulation schemes and channel coding rates;
each of the mobile stations includes
a transmitting unit configured to transmit the signal quality information indicating received signal quality to the base station, and
a receiving unit configured to receive the packets transmitted from the base station in one of the subframes that corresponds to one of the groups to which the each of the mobile stations belongs,
the group management unit configured to determine whether to change the groups to which the respective mobile stations belong based on the signal quality information transmitted from the mobile stations,
the transmitting unit configured to report changes in the groups to the mobile stations, and
each of the changes in the groups is limited such that a corresponding MCS number is decreased or increased by only one at a time.

2. The communication system as claimed in claim 1, wherein transmission rates for the respective subframes transmitted in time sequence are specified such that the subframes are arranged in descending or ascending order of the transmission rates.

3. The communication system as claimed in claim 1, wherein the group management unit is configured to report the changes in the groups to the corresponding mobile stations via L1/L2 control signals.

4. A communication device, comprising:
a group management unit configured to classify mobile stations into groups according to signal quality information transmitted from the mobile stations;
a storing unit configured to store correspondence information on the correspondence between the groups and subframes constituting at least a part of a radio frame;
a scheduling unit configured to schedule packets for the mobile stations according to the correspondence information; and
a transmitting unit configured to transmit the correspondence information to the mobile stations, wherein
the groups are each associated with MCS numbers indicating combinations of modulation schemes and channel coding rates,
the group management unit is configured to determine whether to change the groups to which the respective mobile stations belong based on the signal quality information transmitted from the mobile stations,
the transmitting unit is configured to report changes in the groups to the mobile stations, and
each of the changes in the groups is limited such that a corresponding MCS number is decreased or increased by only one at a time.

5. The communication device as claimed in claim 4, wherein the radio frame is divided into a period for transmitting voice packets and a period for transmitting non-voice packets.

6. The communication device as claimed in claim 4, wherein the correspondence information correlates the groups arranged in order of signal quality with the subframes.

7. The communication device as claimed in claim 4, wherein transmission rates for the respective subframes transmitted in time sequence are specified such that the subframes are arranged in descending or ascending order of the transmission rates.

8. The communication device as claimed in claim 4, wherein the transmitting unit is configured to report the changes in the groups to the mobile stations via L1/L2 control signals.

9. A communication method performed by a base station for a communication system, the method comprising the steps of:
   transmitting correspondence information on the correspondence between groups and subframes constituting at least a part of a radio frame to mobile stations, the groups being associated with MCS numbers indicating combinations of modulation schemes and channel coding rates;
   classifying the mobile stations into the groups according to signal quality information transmitted from the mobile stations; and
   scheduling and transmitting packets for the mobile stations according to the correspondence information;
   determining whether to change the groups to which the respective mobile stations belong based on the signal quality information transmitted from the mobile stations; and
   reporting changes in the groups to the mobile stations,
   wherein each of the changes in the groups is limited such that a corresponding MCS number is decreased or increased by only one at a time.

10. A non-transitory computer readable storage medium storing a program for causing a base station to perform the steps of:
    transmitting correspondence information on the correspondence between groups and subframes constituting at least a part of a radio frame to mobile stations, the groups being associated with MCS numbers indicating combinations of modulation schemes and channel coding rates;
    classifying the mobile stations into the groups according to signal quality information transmitted from the mobile stations; and
    scheduling and transmitting packets for the mobile stations according to the correspondence information;
    determining whether to change the groups to which the respective mobile stations belong based on the signal quality information transmitted from the mobile stations; and
    reporting changes in the groups to the mobile stations,
    wherein each of the changes in the groups is limited such that a corresponding MCS number is decreased or increased by only one at a time.

11. A mobile station for a communication system, comprising:
    a transmitting unit configured to transmit, to a base station, signal quality information indicating signal quality of a signal received from the base station;
    a receiving unit configured to receive, from the base station, correspondence information on the correspondence between groups provided for respective signal quality levels and subframes constituting at least a part of a radio frame and to receive packets transmitted from the base station in one of the subframes that corresponds to one of the groups to which the mobile station belongs, wherein
    the groups are associated with MCS numbers indicating combinations of modulation schemes and channel coding rates;
    the receiving unit is configured to receive a signal indicating a change in the groups to which the mobile station belongs from the base station and to change the subframes for receiving the packets according to the change in the groups; and
    the change in the groups is limited such that a corresponding MCS number is decreased or increased by only one value at a time.

12. A communication method performed by a mobile station for a communication system, the method comprising the steps of:
    transmitting, to a base station, signal quality information indicating signal quality of a signal received from the base station;
    receiving correspondence information on the correspondence between groups provided for respective signal quality levels and subframes constituting at least a part of a radio frame from a base station and receiving packets transmitted from the base station in one of the subframes that corresponds to one of the groups to which the mobile station belongs, the groups being associated with MCS numbers indicating combinations of modulation schemes and channel coding rates;
    receiving a signal indicating a change in the groups to which the mobile station belongs from the base station; and
    changing the subframes for receiving the packets according to the change in groups,
    wherein the change in the groups is limited such that a corresponding MCS number is decreased or increased by only one at a time.

13. A non-transitory computer-readable storage medium storing a program for causing a mobile station to perform the steps of:
    transmitting, to a base station, signal quality information indicating signal quality of a signal received from the base station;
    receiving correspondence information on the correspondence between groups provided for respective signal quality levels and subframes constituting at least a part of a radio frame from the base station and receiving packets transmitted from the base station in one of the subframes that corresponds to one of the groups to which the mobile station belongs, the groups being associated with MCS numbers indicating combinations of modulation schemes and channel coding rates;
    receiving a signal indicating a change in the groups to which the mobile station belongs from the base station; and
    changing the subframes for receiving the packets according to the change in the groups,
    wherein the change in the groups is limited such that a corresponding MCS number is decreased or increased by only one at a time.

* * * * *

UNITED STATES PATENT AND TRADEMARK OFFICE
Certificate

Patent No. 8,155,064 B2　　　　　　　　　　　　　　　　　Patented: April 10, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Atsushi Harada, Kawasaki (JP).

Signed and Sealed this Thirteenth Day of November 2012.

HUY D. VU
*Supervisory Patent Examiner*
Art Unit 2461
Technology Center 2400